US008720909B2

(12) United States Patent
Hu

(10) Patent No.: US 8,720,909 B2
(45) Date of Patent: May 13, 2014

(54) QUICK-RELEASE BIT ADAPTER

(76) Inventor: Bobby Hu, Taichung (TW)

( * ) Notice: Subject to any disclaimer, the term of this patent is extended or adjusted under 35 U.S.C. 154(b) by 800 days.

(21) Appl. No.: 12/983,924

(22) Filed: Jan. 4, 2011

(65) Prior Publication Data

US 2012/0104702 A1 May 3, 2012

(30) Foreign Application Priority Data

Nov. 3, 2010 (TW) ................................ 99137773 A

(51) Int. Cl.
*B23B 31/28* (2006.01)

(52) U.S. Cl.
USPC ........ 279/128; 279/143; 279/155; 81/177.85; 81/438

(58) Field of Classification Search
USPC ........ 279/128, 143–145, 155; 81/438, 177.85
IPC ............................................. B23B 31/06,31/28
See application file for complete search history.

(56) References Cited

U.S. PATENT DOCUMENTS

| | | | | |
|---|---|---|---|---|
| 5,934,384 | A | 8/1999 | Wang | 173/132 |
| 6,666,114 | B1 * | 12/2003 | Lin | 81/438 |
| 7,387,051 | B1 * | 6/2008 | Chiang | 81/124.4 |
| 7,448,302 | B2 * | 11/2008 | Huang | 81/438 |
| 7,469,909 | B2 * | 12/2008 | Strauch et al. | 279/75 |
| 7,891,275 | B2 * | 2/2011 | Huang | 81/438 |
| 8,240,233 | B2 * | 8/2012 | Huang | 81/438 |
| 8,276,483 | B2 * | 10/2012 | Hecht | 81/54 |
| 2008/0217870 | A1 * | 9/2008 | Shibata | 279/82 |
| 2009/0224492 | A1 * | 9/2009 | Lin | 279/82 |
| 2011/0215538 | A1 * | 9/2011 | Cornwell et al. | 279/82 |
| 2012/0160064 | A1 * | 6/2012 | Moss et al. | 81/125 |
| 2012/0280461 | A1 * | 11/2012 | Hu | 279/46.1 |

* cited by examiner

*Primary Examiner* — Eric A Gates
(74) *Attorney, Agent, or Firm* — Alan Kamrath; Kamrath IP Lawfirm, P.A.

(57) ABSTRACT

A quick-release bit adapter includes a body having first and second ends spaced along a longitudinal axis. The body includes a driving hole extending from the first end towards the second end along the longitudinal axis. The body further includes a sliding groove in communication with the driving hole and intermediate the driving hole and the second end along the longitudinal axis. A through-hole extends from an outer periphery of the first end through the sliding groove. A bit received in the driving hole abuts and is stopped by at least one protrusion extending inward from an inner periphery of the driving hole towards the longitudinal axis. A magnetic device is slideably received in the sliding groove and controllable by a user through the through-hole to slide along the longitudinal axis between two positions to engage with or disengage from the bit.

16 Claims, 14 Drawing Sheets

QUICK-RELEASE BIT ADAPTER

BACKGROUND OF THE INVENTION

The present invention relates to a bit adapter and, more particularly, to a quick-release bit adapter allowing quick release of a bit.

U.S. Pat. No. 5,934,384 discloses a transmission shaft and a bit mounting arrangement for a motor-driven hand drill. The transmission shaft includes a coupling hole in a front end thereof for coupling with a bit. A coupling rod extends from a rear end of the transmission shaft for engaging with a motor-driven hand drill. A chuck is mounted on the front end of the transmission shaft. A compression spring pushes a stop member to engage with cuts of the bit to fix the bit, preventing the bit from falling out of the coupling hole. Furthermore, a magnet is mounted in the coupling hole. The chuck is moved rearward to disengage from the bit when it is desired to remove the bit. In this case, the bit is still attracted by the magnet, preventing the bit from being disengaged from the coupling hole under the action of gravity.

However, the front end of the bit exposed outside of the coupling hole is relatively short such that the user has to overcome the magnetic attraction of the magnet by tightly gripping the front end of the bit by the finger tips and forcibly moving the bit outward, which is laborsome. Furthermore, the front ends of the bits of different sizes differ from each other in size. Thus, it is difficult for the user to grip and apply force to the front ends of bits of small sizes due to small contact surfaces with the finger tips of the user, resulting in difficulties in removing the bit. Furthermore, the hand of the user is often stained with oil, leading to small friction between the finger tips of the user and the front end of the bit and causing difficulties in removing the bit. A pair of pliers has to be used to clamp and remove the bit, causing troubles to users frequently use the transmission shaft or professional workers during replacement of bits. Furthermore, the chuck mounted around the front end of the transmission shaft increases the overall outer diameter of the transmission rod such that the transmission rod can not reach small holes. In some cases, the chuck is impinged by an inner periphery of a small hole and loses its clamping function, resulting in hazard during working. Thus, the transmission shaft and the bit mounting arrangement are inconvenient and unsafe.

Thus, a need exists for a novel quick-release bit adapter allowing quick release of a bit while providing enhanced safety during use.

BRIEF SUMMARY OF THE INVENTION

The present invention solves this need and other problems in the field of convenient, quick, safe release of bits by providing a quick-release bit adapter includes a body having first and second ends spaced along a longitudinal axis. The first end of the body is adapted to engage with a bit. The second end of the body is adapted to be rotated to drive the bit to rotate. The body includes a non-circular driving hole extending from the first end towards the second end of the body along the longitudinal axis. The driving hole is adapted to removably receive the bit. The body further includes a sliding groove in communication with the driving hole and intermediate the driving hole and the second end of the body along the longitudinal axis. A through-hole extends from an outer periphery of the first end of the body through the sliding groove. At least one protrusion extends inward from an inner periphery of the driving hole towards the longitudinal axis. The bit abuts and is stopped by the at least one protrusion when the bit is received in the driving hole. The at least one protrusion has a spacing to an end face of the first end of the body along the longitudinal axis. A magnetic device is slideably received in the sliding groove of the body. The magnetic device is controllable by a user through the through-hole to slide along the longitudinal axis between first and second positions. When the magnetic device is in the first position, the magnetic device attracts and comes in contact with the bit, preventing the bit from disengaging from the driving hole of the body. When the magnetic device is in the second position, the magnetic device is disengaged from the bit, allowing removal of the bit from the driving hole of the body.

In an embodiment, the driving hole has hexagonal cross sections and is adapted to receive a hexagonal bit. The body includes six protrusions spaced at regular intervals and formed on six corners of the driving hole and located adjacent the sliding groove. The six protrusions are adapted to abut six corners of the bit received in the driving hole. The sliding groove has circular cross sections and has a diameter smaller than a spacing between two diagonal corners of the driving hole. Each protrusion is a stepped protrusion formed between the driving hole and the sliding groove.

In an embodiment, the magnetic device includes a magnetic member and a control member. The magnetic member is slideably received in the sliding groove of the body. The control member extends through the through-hole of the body and is engaged with the magnetic member to move therewith. The control member has a control portion extending beyond the through-hole of the body for manual operation to move the magnetic member in the sliding groove between the first and second positions to engage or disengage the magnetic member with or from the bit. The outer periphery of the first end of the body includes a recessed portion in which the through-hole is defined. The control portion of the control member is received in the recessed portion and does not extend beyond the outer periphery of the first end of the body.

In another embodiment, the magnetic member includes a magnetic seat and a magnet engaged with an end of the magnetic seat. The magnetic seat includes an engaging hole. The control member includes an engaging portion. The first end of the body further includes a hole aligned with the through-hole. The engaging portion extends through the through-hole and the hole of the body and the engaging hole of the magnetic seat.

In another embodiment, the outer periphery of the first end of the body includes a second recessed portion. The hole is defined in the second recessed portion. The control member further includes a second control portion received in the second recessed portion. The engaging portion of the control member is engaged with the second control portion.

In an embodiment, the second end of the body has hexagonal cross sections and is adapted to be driven by a power tool.

In another embodiment, the first end of the body is a tubular portion. The second end of the body is a hexagonal rod having an end inserted into the tubular portion, engaging the hexagonal rod with the tubular portion by tight coupling.

In another embodiment, the first end of the body is a tubular portion. The second end of the body is a hexagonal rod including an end having a plurality of ridges extending along the longitudinal axis. The end of the hexagonal rod is inserted into the tubular portion. The ridges are engaged with an inner periphery of the tubular portion to engage the hexagonal rod with the tubular portion.

In another embodiment, the second end of the body is a handle. The handle is adapted to be gripped by the user to rotate the body for driving the bit.

The present invention will become clearer in light of the following detailed description of illustrative embodiments of this invention described in connection with the drawings.

DESCRIPTION OF THE DRAWINGS

The illustrative embodiments may best be described by reference to the accompanying drawings where.

Figure 1:
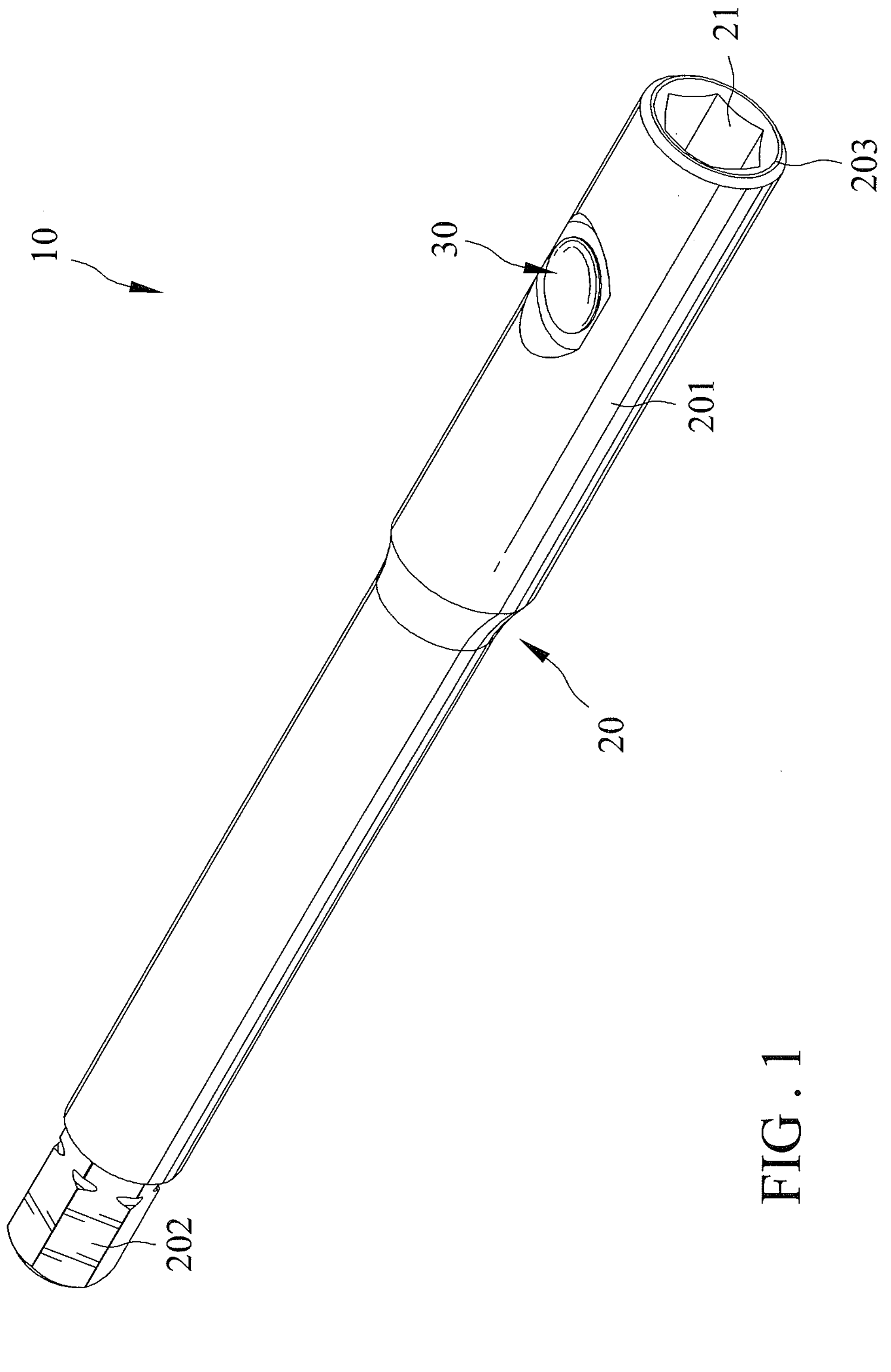
FIG. 1 shows a perspective view of a bit adapter of a first embodiment according to the present invention.
Figure 2:
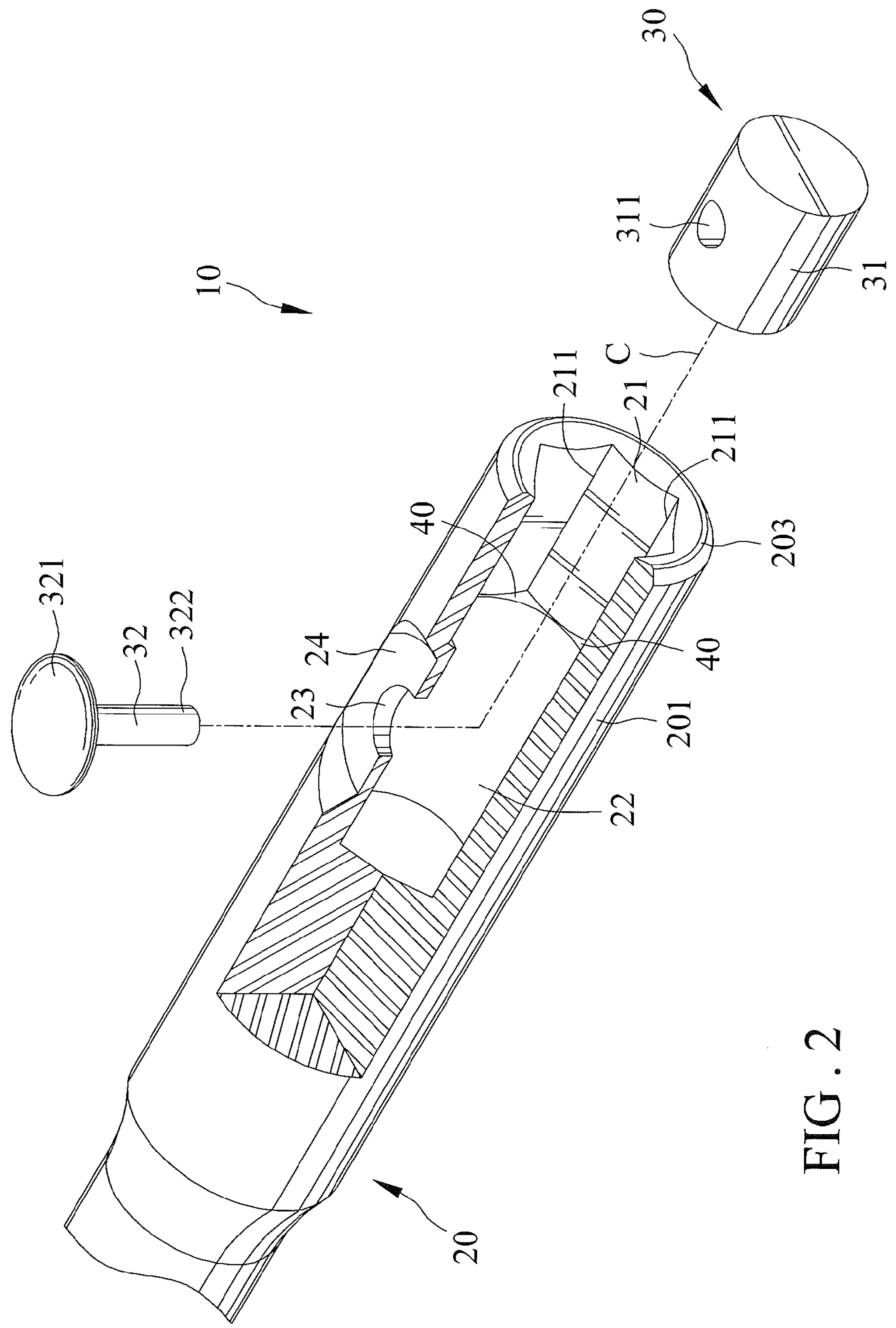
FIG. 2 shows a partial, exploded, perspective view of the bit adapter of FIG. 1 with portions broken away.
Figure 3:
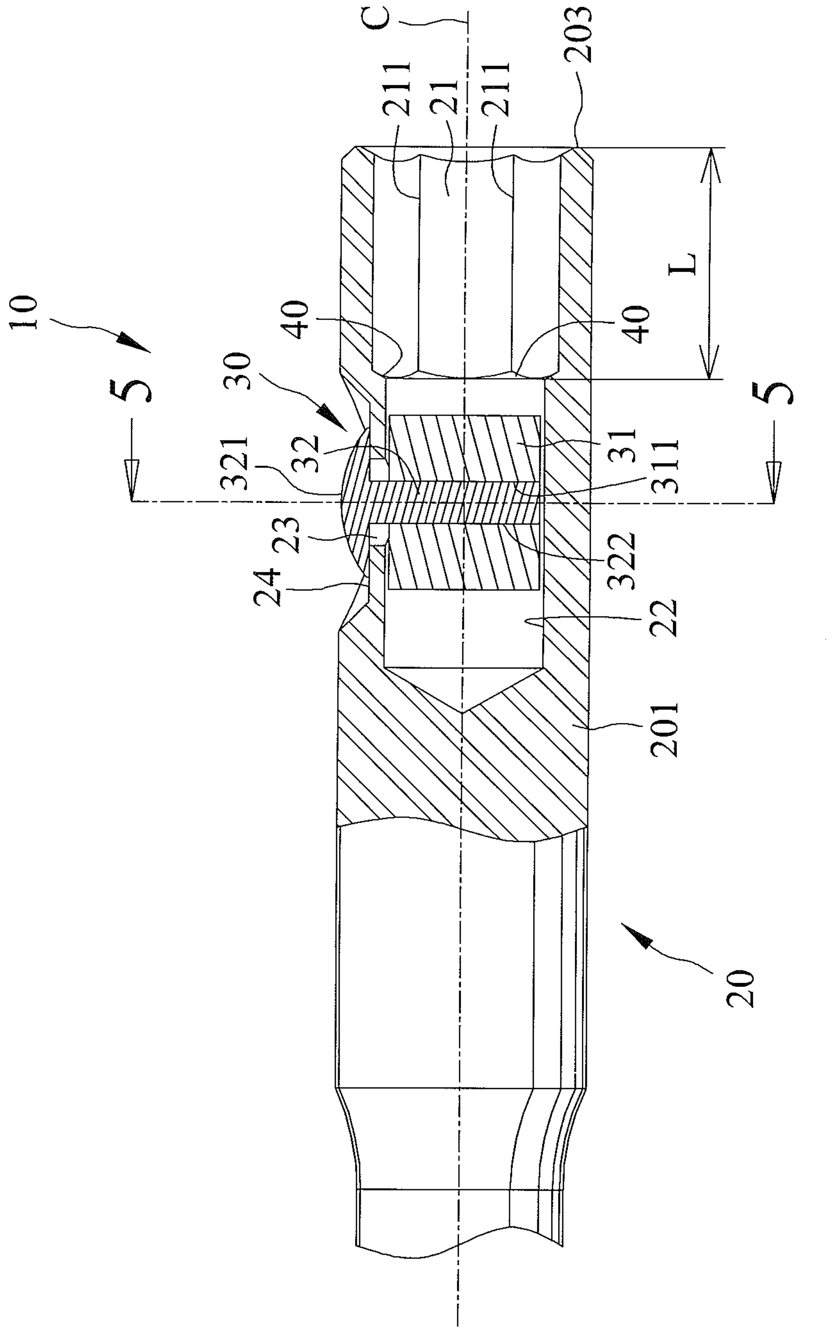
FIG. 3 shows a partial, side view of the bit adapter of FIG. 1 with portions cross sectioned.

All figures are drawn for ease of explanation of the basic teachings of the present invention only; the extensions of the figures with respect to number, position, relationship, and dimensions of the parts to form the preferred embodiments will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "first", "second", "inner", "outer", "end", "portion", "longitudinal", "inward", "spacing", "depth", and similar terms are used herein, it should be understood that these terms have reference only to the structure shown in the drawings as it would appear to a person viewing the drawings and are utilized only to facilitate describing the invention.

DETAILED DESCRIPTION OF THE INVENTION

With reference to FIGS. 1-10, a quick-release bit adapter 10 of a first embodiment according to the present invention includes a substantially cylindrical body 20 and a magnetic device 30. Body 20 includes first and second ends 201 and 202 spaced along a longitudinal axis C. First end 201 of body 20 is adapted to engage with a bit 90. Second end 202 of body 20 is adapted to be rotated by rotational force to drive bit 90 to rotate. Body 20 includes a non-circular driving hole 21 extending from first end 201 towards but spaced from second end 202 of body 20 along longitudinal axis C. Driving hole 21 is adapted to removably receive bit 90. In this embodiment, driving hole 21 has hexagonal cross sections for receiving a hexagonal bit 90. Second end 202 has hexagonal cross sections and can be driven by a power tool providing the rotational force.

Body 20 further includes a sliding groove 22 in communication with driving hole 21 and intermediate driving hole 21 and second end 202 of body 20 along longitudinal axis C. A through-hole 23 extends from an outer periphery of first end 201 of body 20 through sliding groove 22.

At least one protrusion 40 extends inward from an inner periphery of driving hole 21 towards longitudinal axis C. When bit 90 is received in driving hole 21, bit 90 abuts and is stopped by protrusion 40, preventing bit 90 from entering too deep into body 20. Protrusion 40 has a spacing L to an end face 203 of first end 201 of body 20 along longitudinal axis L. Protrusion 40 is located adjacent sliding groove 22 (i.e., distant to end face 203 of first end 21 of body 20). Thus, when bit 90 abuts and is stopped by protrusion 40, bit 90 is received in the whole depth of driving hole 21, providing high torque transmission effect during rotation of bit 90 driven by body 20. In this embodiment, driving hole 21 includes six protrusions 40 spaced at regular intervals and formed on six corners of driving hole 21. Protrusions 40 are adapted to abut six corners of bit 90 received in driving hole 21.

Furthermore, in this embodiment, sliding groove 22 has circular cross sections and has a diameter D22 smaller than a spacing between two diagonal corners of driving hole 21. Thus, each protrusion 40 can be a stepped protrusion directly formed between driving hole 21 and sliding groove 22, allowing rapid, simple machinery processing.

Magnetic device 30 is slideably received in sliding groove 22 of body 20. Magnetic device 30 is controllable by a user to slide along longitudinal axis L between first and second positions. When magnetic device 30 is in the first position, magnetic device 30 attracts and comes in contact with bit 90, preventing bit 90 from disengaging from driving hole 21 of body 20. When magnetic device 30 is in the second position, magnetic device 30 is disengaged from bit 90, allowing easy removal of bit 90 from driving hole 21 of body 20.

Since spacing L between each protrusion 40 and end face 203 of first end 201 of body 20 along longitudinal axis C is constant, bit 90 can be received in the whole depth of driving hole 21, providing high torque transmission effect during rotation of bit 90 driven body 20 while preventing bit 90 from disengaging from driving hole 21 to assure work safety.

Magnetic device 30 includes a magnetic member 31 and a control member 32. Magnetic member 31 is slideably received in sliding groove 22 of body 20 and is adapted to attract bit 90. Control member 32 extends through through-hole 23 of body 20 and is engaged with magnetic member 31 to move therewith. Control member 32 has a control portion 321 extending beyond through-hole 23 of body 20 for manual operation to move magnetic member 31 in sliding groove 22 between the first and second positions to engage or disengage magnetic member 31 with or from bit 90.

Magnetic member 31 includes an engaging hole 311. Control member 32 includes an engaging portion 322. Engaging portion 322 extends through through-hole 23 of body 20 and is engaged in engaging hole 311 of magnetic member 31. In this embodiment, magnetic member 31 is a magnet.

Figure 5:
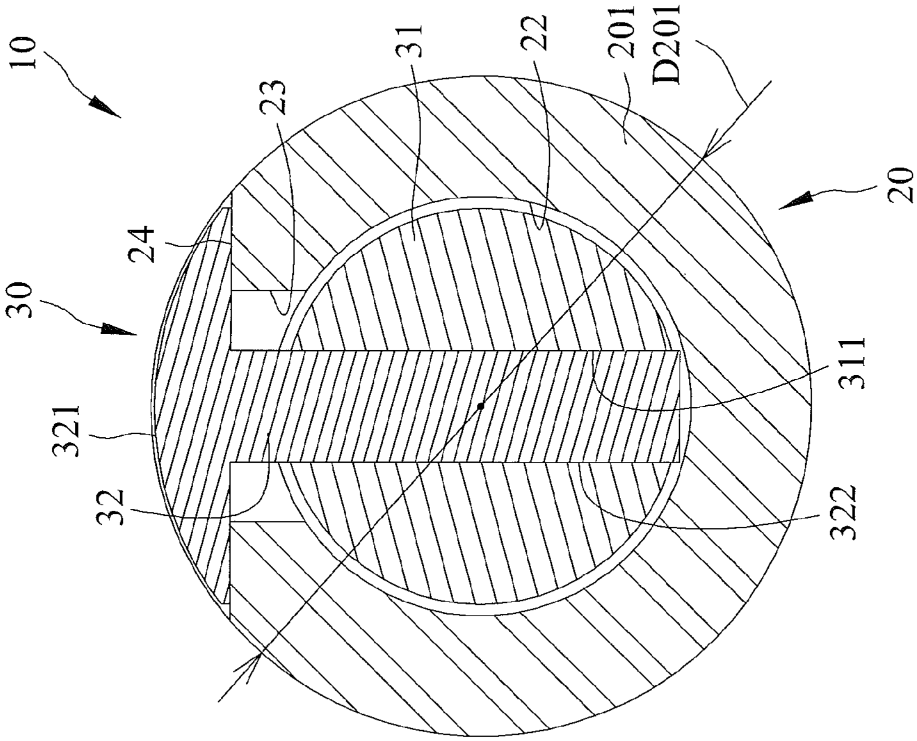
FIG. 5 shows a cross sectional view of the bit adapter of FIG. 1 according to section line 5-5 of FIG. 3.
Figure 4:
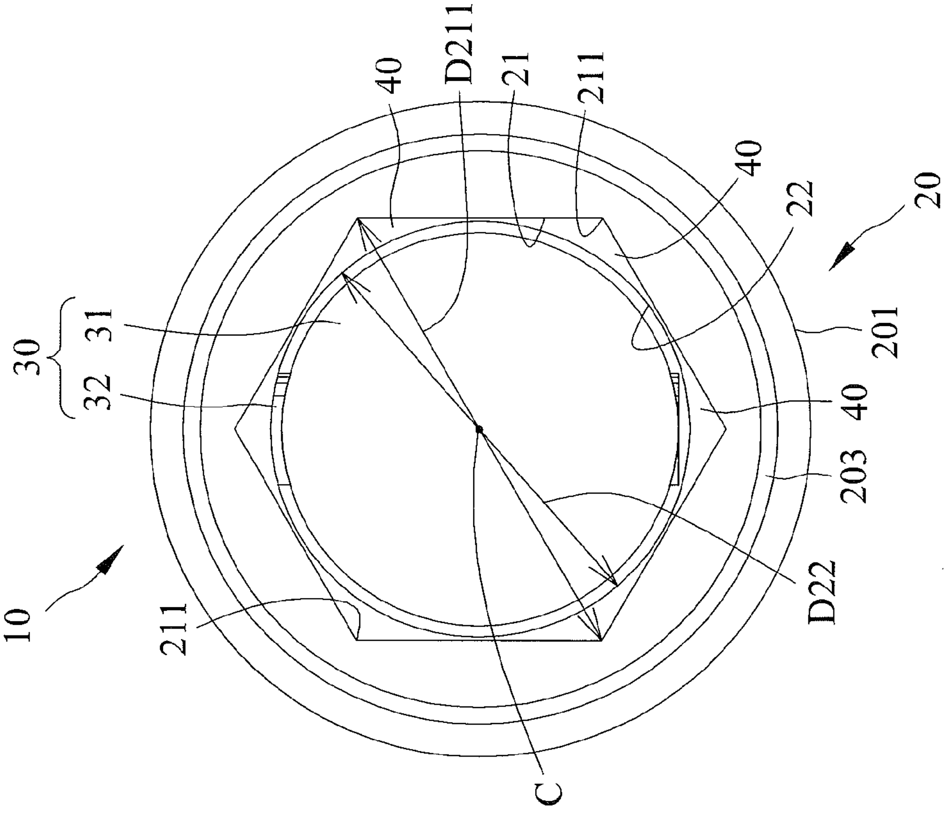
FIG. 4 shows an end view of the bit adapter of FIG. 1.

Furthermore, the outer periphery of first end 201 of body 20 has an outer diameter D201. Control portion 321 of control member 32 does not extend beyond outer diameter D201 of the outer periphery of first end 201 of body 20, as shown in FIG. 5. Thus, quick-release bit adapter 10 according to the present invention can be inserted into a small hole for rotating operation without the risk of being impinged by an inner periphery of the small hole that may cause disengagement of bit 90, enhancing safety during use. In this embodiment, the outer periphery of first end 201 of body 20 includes a recessed portion 24 in which through-hole 23 is defined. Control portion 321 of control member 32 is received in recessed portion 24 without extending beyond the outer periphery of outer diameter D201 of first end 201 of body 20.

Figure 6:
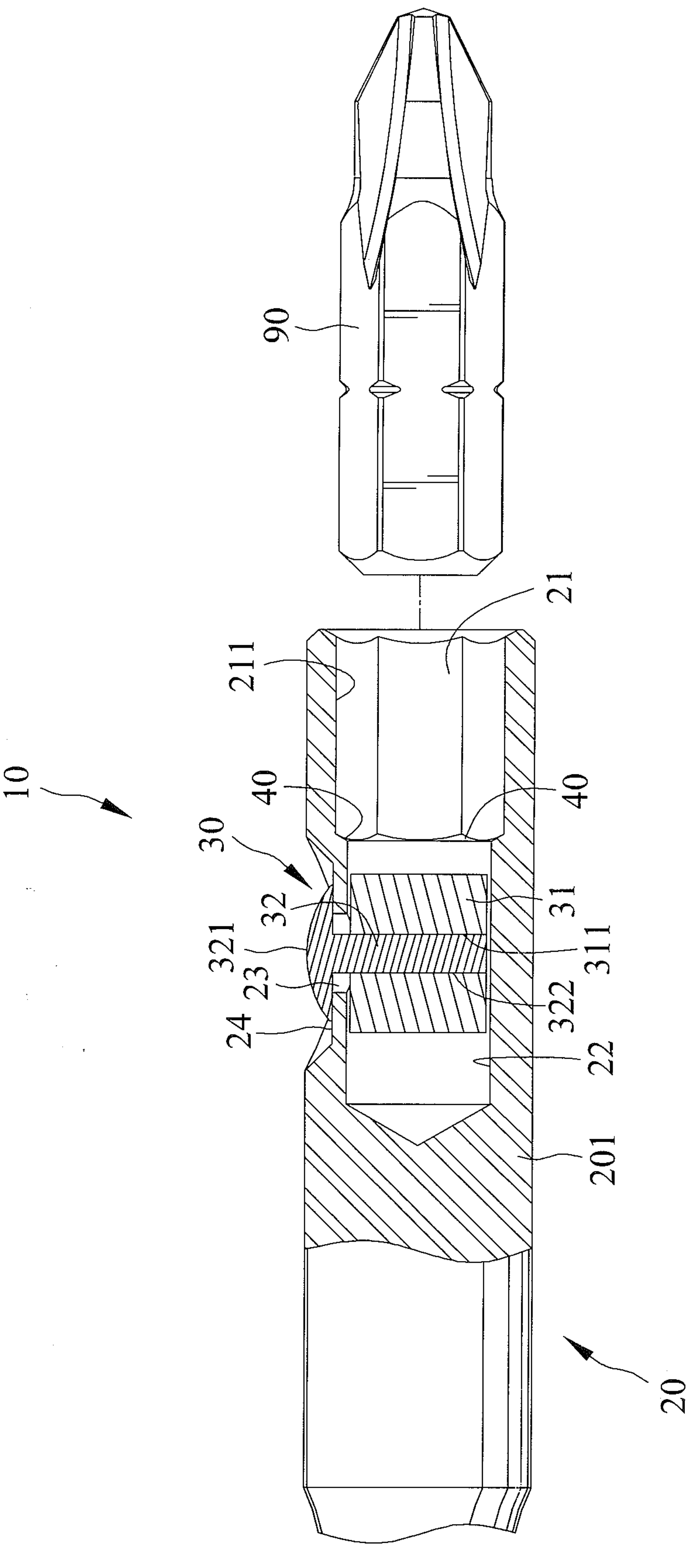
FIG. 6 shows a partial, side view of the bit adapter of FIG. 3 and a bit.
Figure 7:
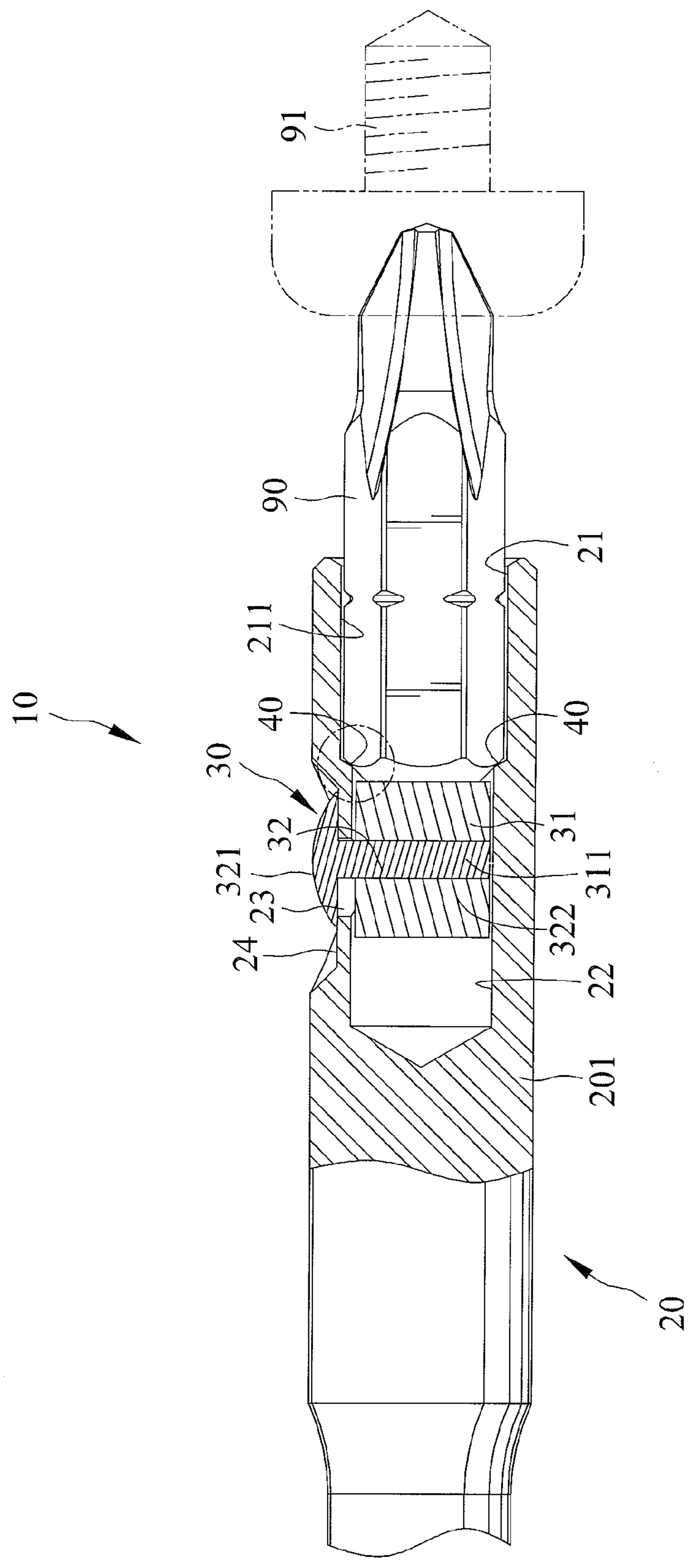
FIG. 7 is a view similar to FIG. 6, wherein the bit is engaged with the bit adapter and attracted by a magnetic member.
Figure 8:
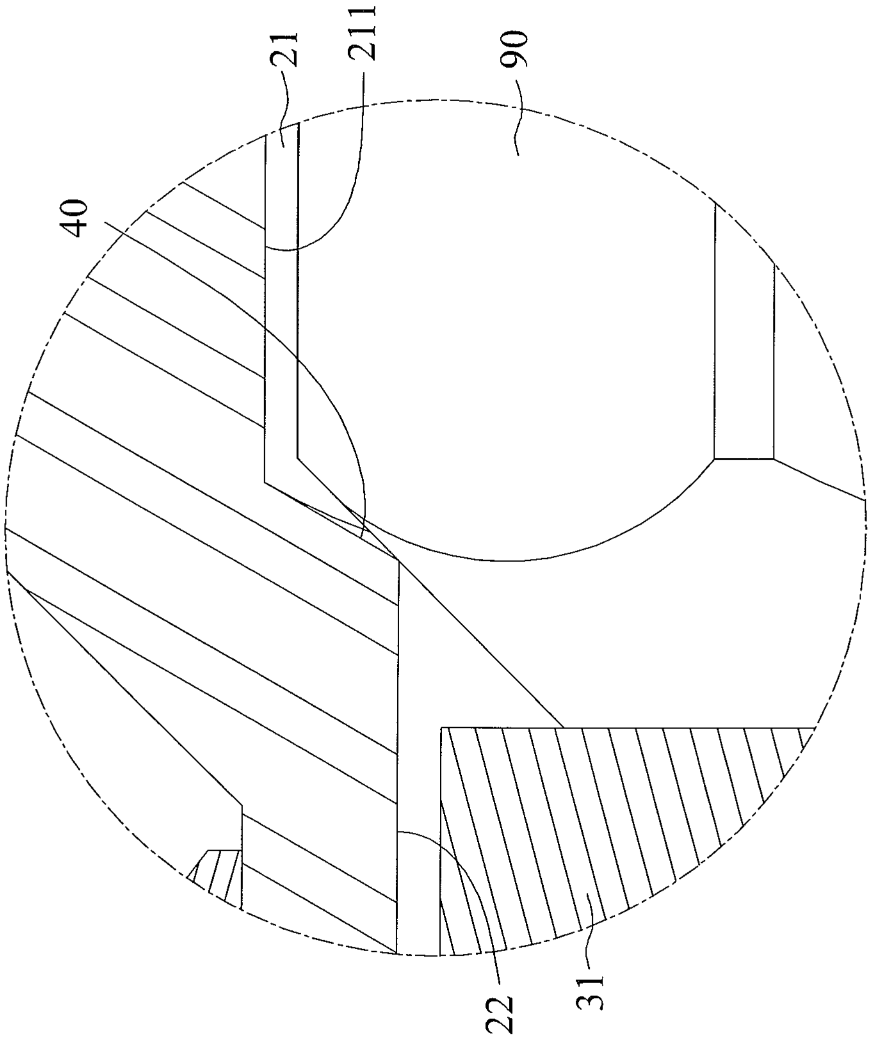
FIG. 8 shows an enlarged view of a circled portion in FIG. 7.

FIGS. 6-8 shows use of quick-release bit adapter 10 according to the present invention. Specifically, bit 90 is inserted into driving hole 21. Magnetic device 30 is moved to the first position in which magnetic member 31 comes in contact with and attracts bit 90, firmly retaining bit 90 in driving hole 21. In this case, quick-release bit adapter 10 according to the present invention is ready for driving a screw 91 or the like.

Figure 9:
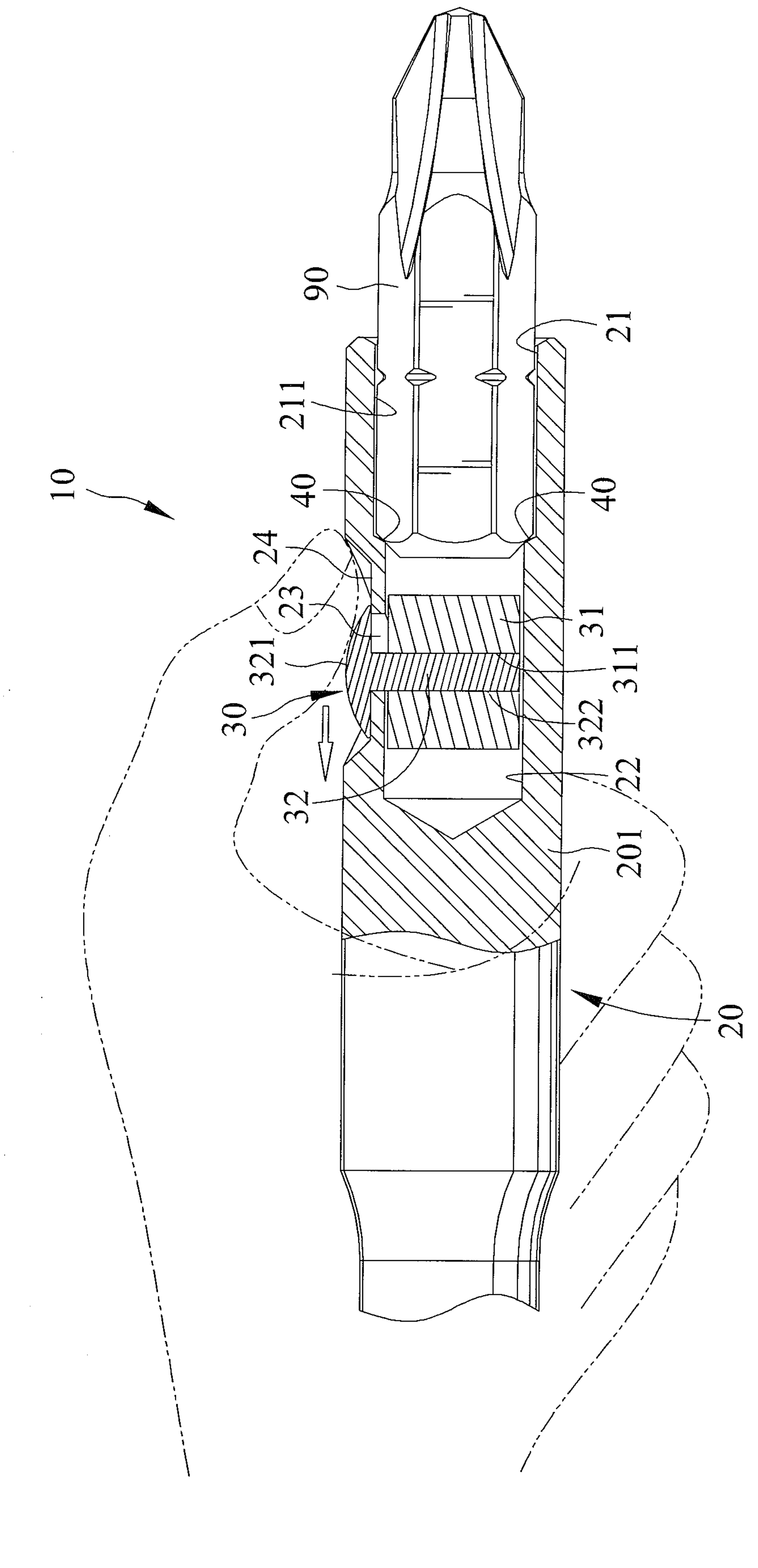
FIG. 9 is a view similar to FIG. 7, wherein the magnetic member is disengaged from the bit.
Figure 10:
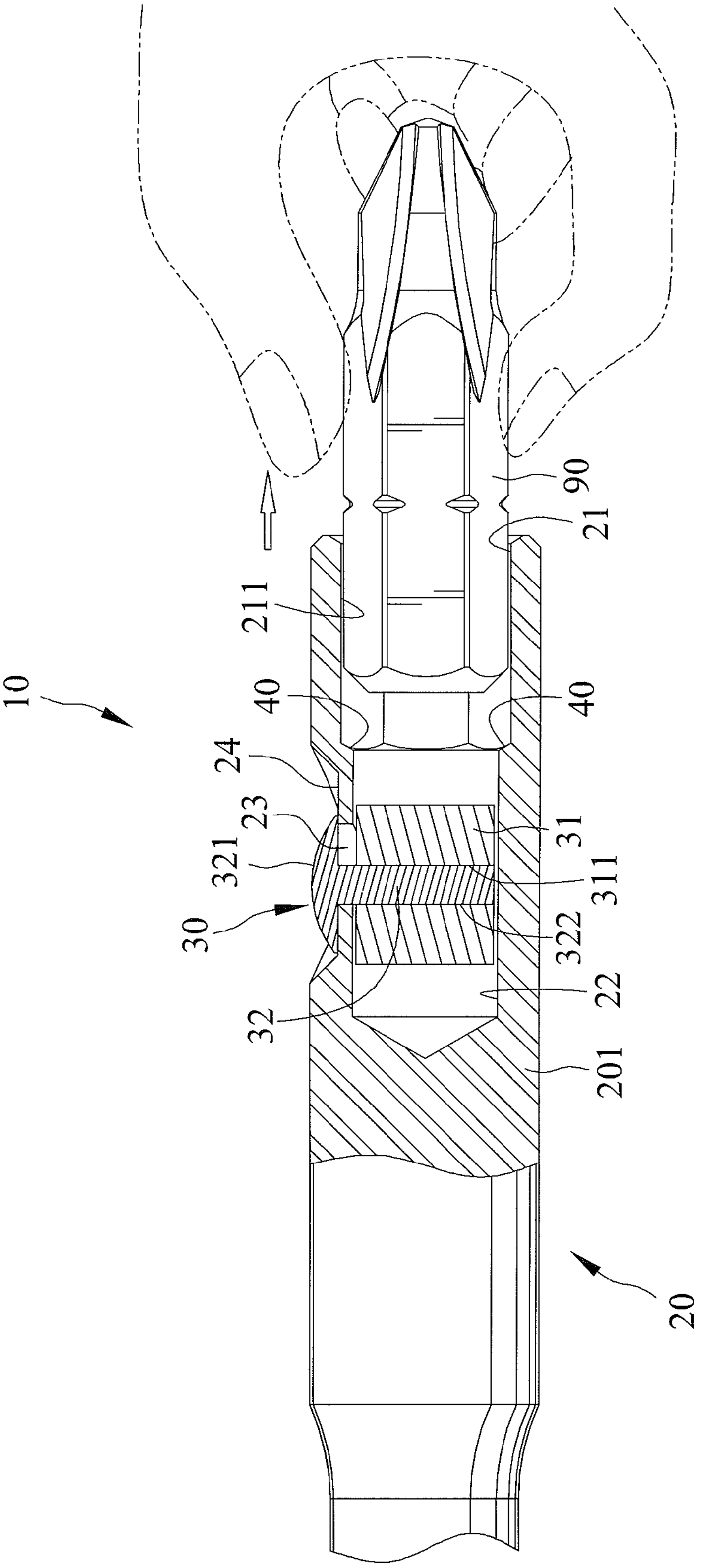
FIG. 10 is a view similar to FIG. 9, illustrating removal of the bit.

FIGS. 9 and 10 show disengagement of bit 90 from quick-release bit adapter 10 according to the present invention. Specifically, magnetic device 30 is moved to the second position by manually moving control member 32 away from driving hole 21. Magnetic member 31 is disengaged from bit 90, allowing easy removal of bit 90 from driving hole 21.

Since bit 90 is stopped by protrusions 40, bit 90 can not move together with magnetic device 30 when magnetic device 30 is moving to the second position, allowing easy, rapid separation of bit 90 and magnetic member 31.

Figure 11:
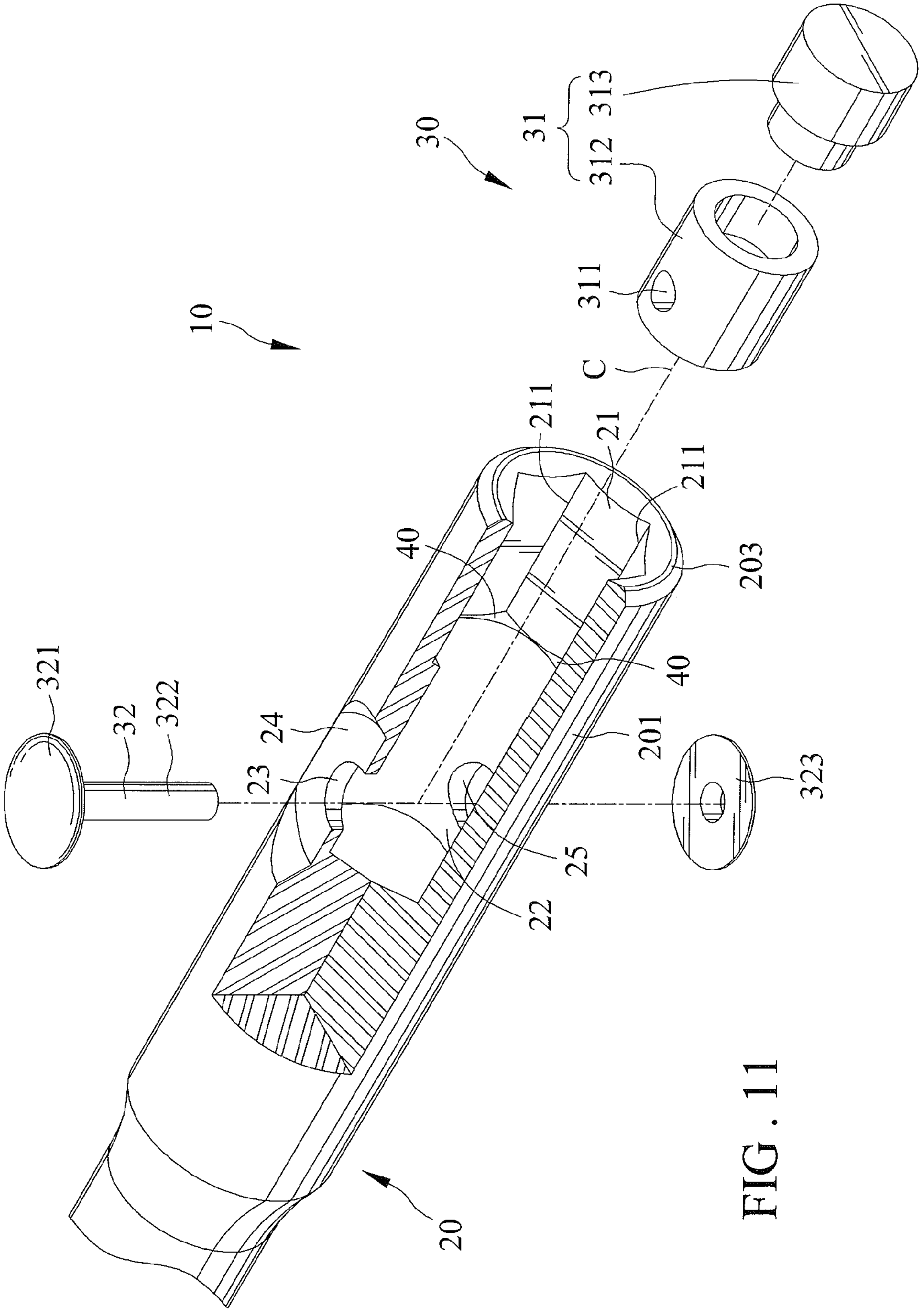
FIG. 11 shows a partial, exploded, perspective view of a bit adapter of a second embodiment according to the present invention with portions broken away.
Figure 12:
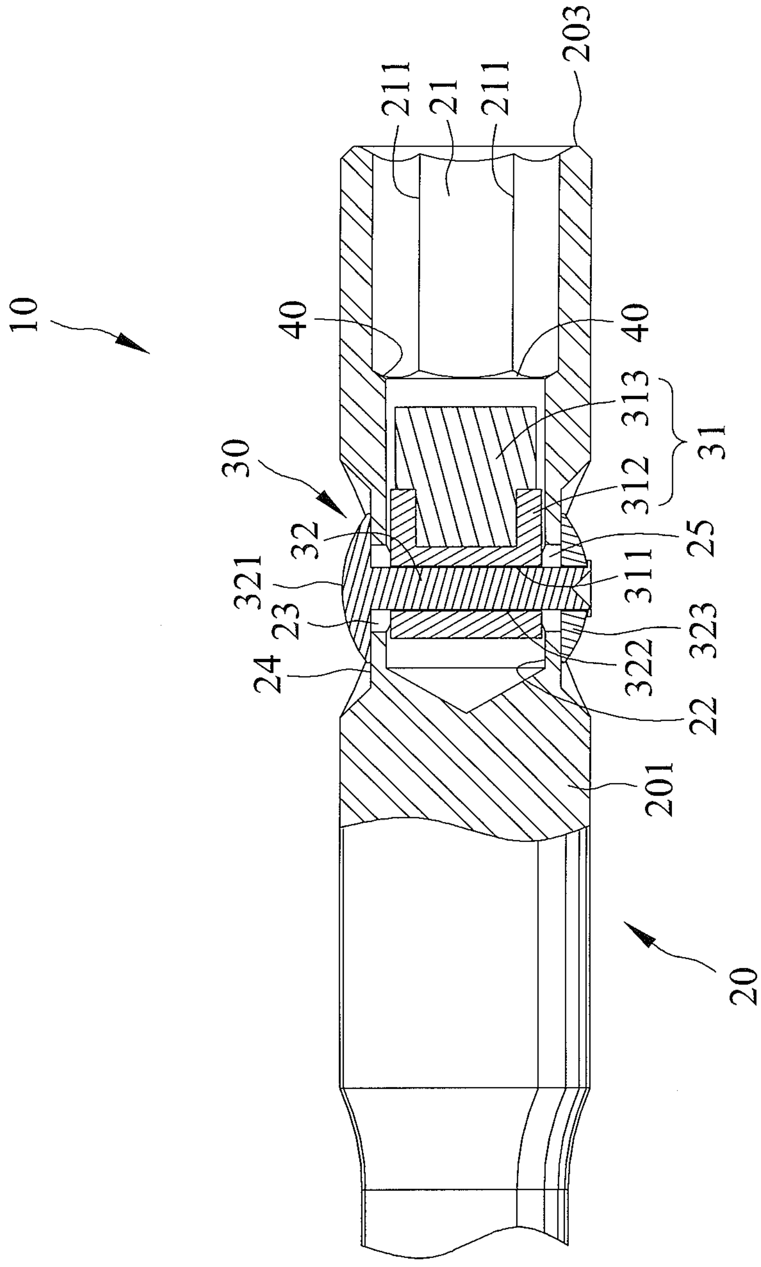
FIG. 12 shows a partial, side view of the bit adapter of FIG. 11 with portions cross sectioned.
Figure 13:
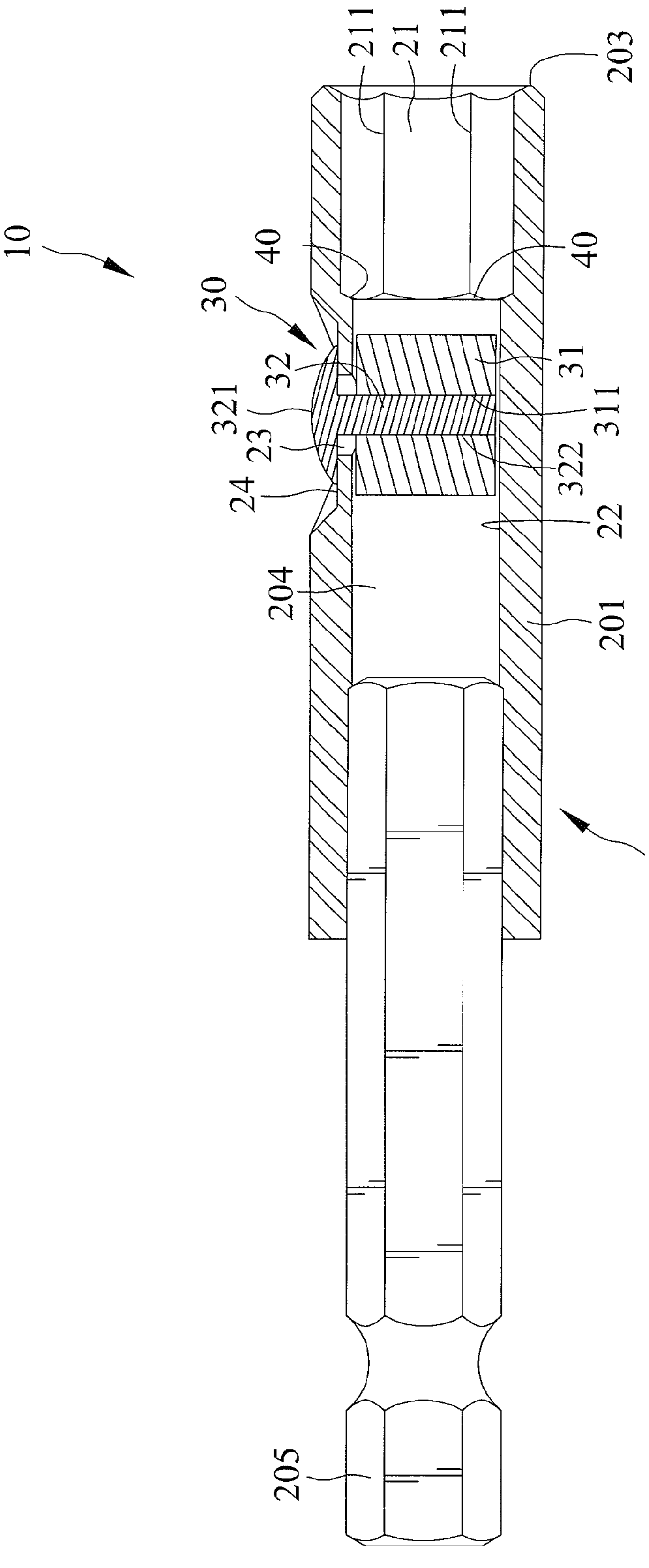
FIG. 13 shows a cross sectional view of a bit adapter of a third embodiment according to the present invention.

FIGS. 11 and 12 show a quick-release bit adapter of a second embodiment according to the present invention. The second embodiment is substantially the same as the first embodiment except that magnetic member 31 includes a magnetic seat 312 and a magnet 313 engaged with an end of magnetic seat 312. Magnetic seat 312 includes engaging hole 311 and is made of stainless steel or other insulating material, assuring reliable magnetic attraction between magnetic member 31 and bit 90. Control member 32 includes an engaging portion 322. First end 201 of body 20 further includes a hole 25 aligned with through-hole 23. Engaging portion 322 is extended through through-hole 23 and hole 25 of body 20 and engaging hole 311 of magnetic seat 312. Preferably, the outer periphery of first end 201 of body 20 includes a second recessed portion 24 in which hole 25 is defined. Control member 32 further includes a second control portion 323 received in second recessed portion 24 without extending beyond the outer periphery of outer diameter D201 of first end 201 of body 20. Engaging portion 322 of control member 32 is engaged with second control portion 323.

FIG. 12 shows a quick-release bit adapter 10 of a third embodiment according the present invention. The third embodiment is substantially the same as the first embodiment except that first end 201 of body 20 is a tubular portion 204, and second end 202 of body 20 is a hexagonal rod 205 having an end inserted into tubular portion 204, engaging hexagonal rod 205 with tubular portion 204 by tight coupling.

Figure 14:
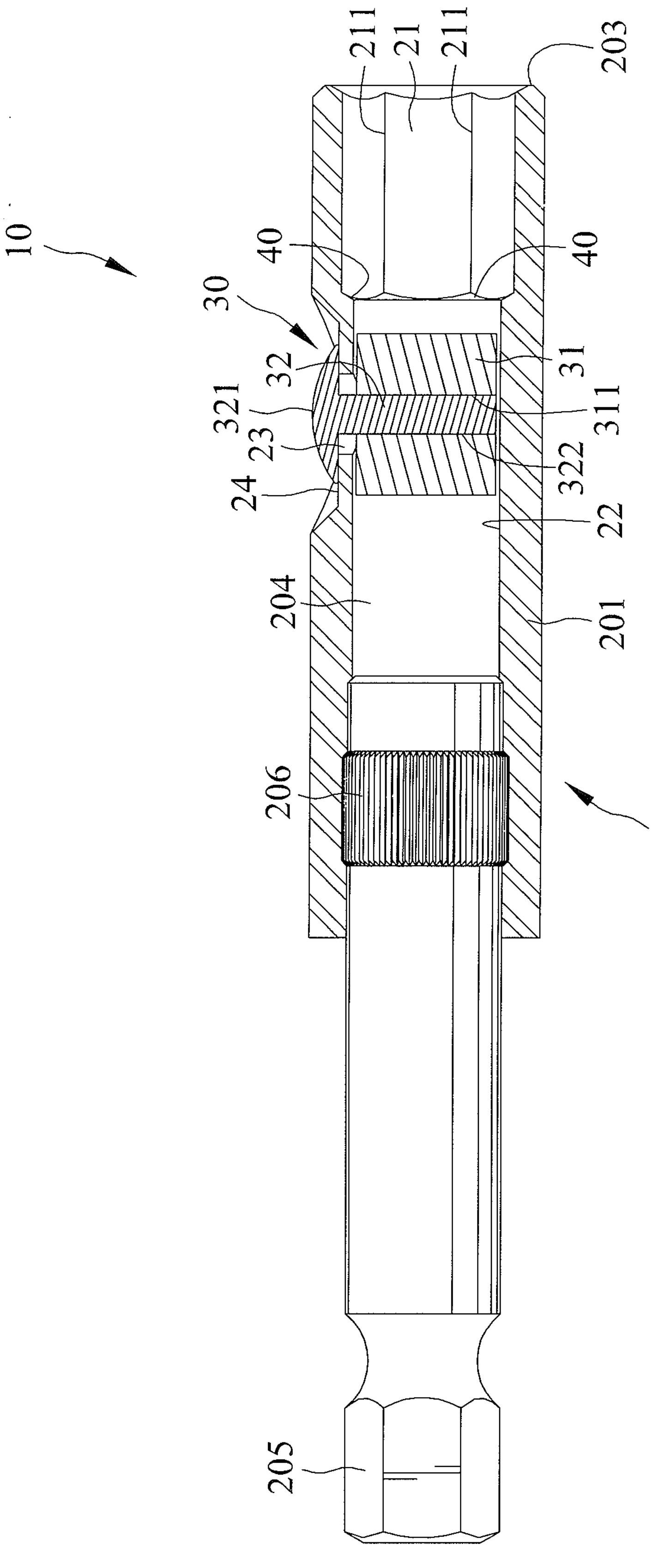
FIG. 14 shows a cross sectional view of a bit adapter of a fourth embodiment according to the present invention.

FIG. 14 shows a quick-release bit adapter 10 of a fourth embodiment according the present invention. The fourth embodiment is substantially the same as the first embodiment except that first end 201 of body 20 is a tubular portion 204, and second end 202 of body 20 is a hexagonal rod 205 including an end having a plurality of ridges 206 extending along longitudinal axis C. The end of hexagonal rod 205 is inserted into tubular portion 204 with ridges 206 engaged with an inner periphery of tubular portion 204 to engage the hexagonal rod 205 with the tubular portion 204.

Figure 15:
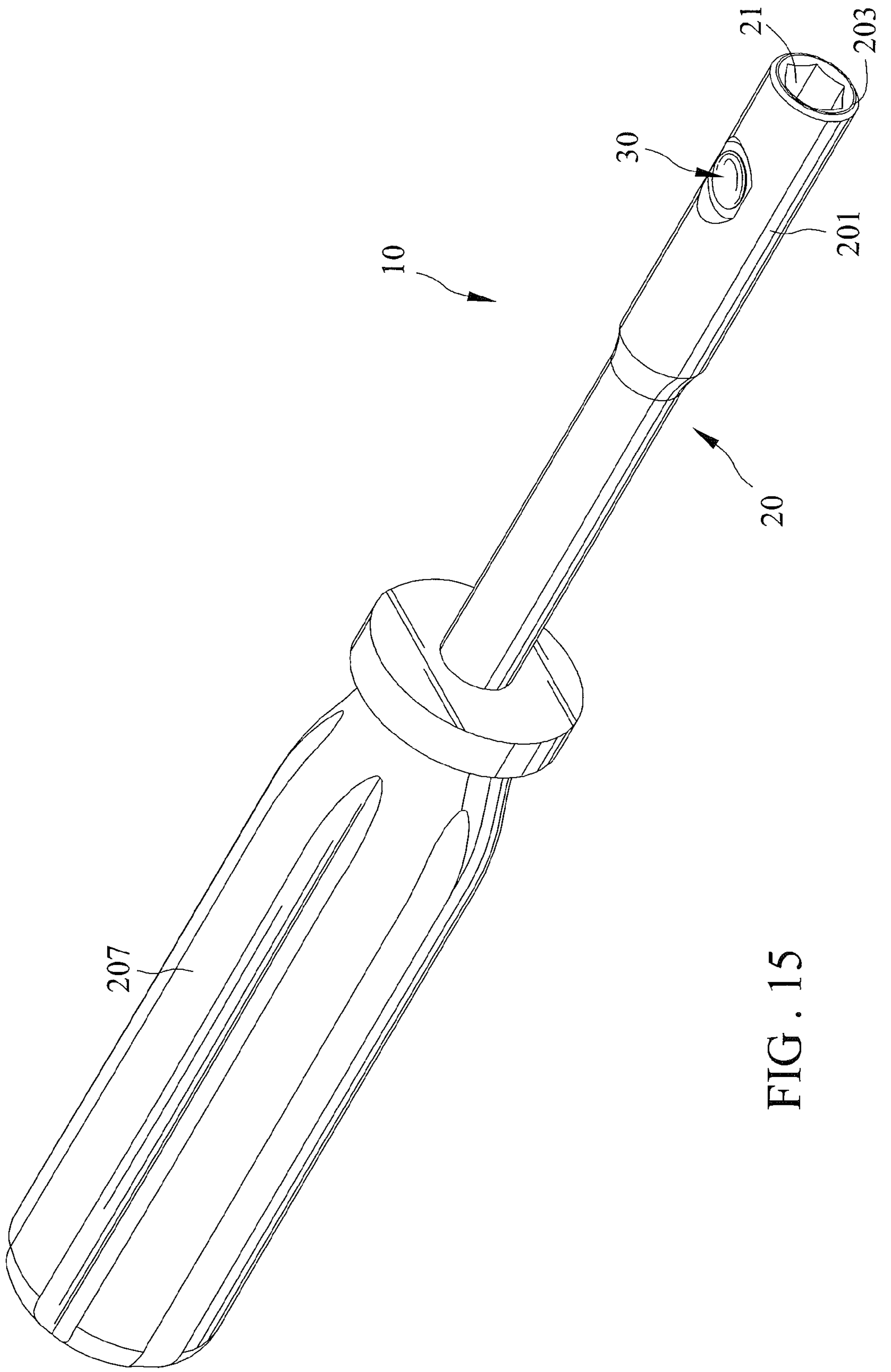
FIG. 15 shows a perspective view of a bit adapter of a fifth embodiment according to the present invention.

FIG. 15 shows a quick-release bit adapter 10 of a fifth embodiment according the present invention. The fifth embodiment is substantially the same as the first embodiment except that second end 202 of body 20 is a handle 207. Handle 207 can be gripped by a user to rotate body 20 for driving bit 90.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. A quick-release bit adapter comprising:

a body including first and second ends spaced along a longitudinal axis, with the first end of the body adapted to engage with a bit, with the second end of the body adapted to be rotated to drive the bit to rotate, with the body including a non-circular driving hole extending from the first end towards the second end of the body along the longitudinal axis, with the driving hole adapted to removably receive the bit, with the body further including a sliding groove in communication with the driving hole and intermediate the driving hole and the second end of the body along the longitudinal axis, with a through-hole extending from an outer periphery of the first end of the body through the sliding groove, with at least one protrusion extending inward from an inner periphery of the driving hole towards the longitudinal axis, with the bit abutting and stopped by said at least one protrusion when the bit is received in the driving hole, with said at least one protrusion having a spacing to an end face of the first end of the body along the longitudinal axis; and a magnetic device slideably received in the sliding groove of the body, with the magnetic device being controllable by a user through the through-hole to slide along the longitudinal axis between first and second positions, wherein when the magnetic device is in the first position, the magnetic device attracts and comes in contact with the bit, preventing the bit from disengaging from the driving hole of the body, and wherein when the magnetic device is in the second position, the magnetic device is disengaged from the bit, allowing removal of the bit from the driving hole of the body.

2. The quick-release bit adapter as claimed in claim 1, wherein said at least one protrusion is located adjacent the sliding groove.

3. The quick-release bit adapter as claimed in claim 1, with the driving hole having hexagonal cross sections and six corners and adapted to receive a hexagonal bit, with said at least one protrusion including six protrusions spaced at regular intervals and formed on the six corners of the driving hole, with the six protrusions adapted to abut six corners of the bit received in the driving hole.

4. The quick-release bit adapter as claimed in claim 1, with the driving hole having hexagonal cross sections having six corners, with the sliding groove having circular cross sections and having a diameter smaller than a spacing between two diagonal corners of the driving hole, with said at least one protrusion being a stepped protrusion formed between the driving hole and the sliding groove.

5. The quick-release bit adapter as claimed in claim 1, with the magnetic device including a magnetic member and a control member, with the magnetic member slideably received in the sliding groove of the body, with the control member extending through the through-hole of the body and engaged with the magnetic member to move therewith, with the control member having a control portion extending beyond the through-hole of the body for manual operation to move the magnetic member in the sliding groove between the first and second positions to engage or disengage the magnetic member with or from the bit.

6. The quick-release bit adapter as claimed in claim 5, with the outer periphery of the first end of the body having an outer diameter, with the control portion of the control member not extending beyond the outer diameter of the outer periphery of the first end of the body.

7. The quick-release bit adapter as claimed in claim 6, with the outer periphery of the first end of the body including a recessed portion, with the through-hole defined in the recessed portion, with the control portion of the control member received in the recessed portion and not extending beyond the outer periphery of the first end of the body.

8. The quick-release bit adapter as claimed in claim 5, wherein the magnetic member is a magnet.

9. The quick-release bit adapter as claimed in claim 5, with the magnetic member including an engaging hole, with the control member including an engaging portion, with the engaging portion extending through the through-hole of the body and engaged in the engaging hole of the magnetic member.

10. The quick-release bit adapter as claimed in claim 5, with the magnetic member including a magnetic seat and a magnet engaged with an end of the magnetic seat.

11. The quick-release bit adapter as claimed in claim 10, with the magnetic seat including an engaging hole, with the control member including an engaging portion, with the first end of the body further including a hole aligned with the through-hole, with the engaging portion extending through the through-hole and the hole of the body and the engaging hole of the magnetic seat.

12. The quick-release bit adapter as claimed in claim 11, with the outer periphery of the first end of the body including a second recessed portion, with the hole defined in the second recessed portion, with the control member further including a second control portion received in the second recessed portion, with the engaging portion of the control member engaged with the second control portion.

13. The quick-release bit adapter as claimed in claim 1, with the second end of the body having hexagonal cross sections and adapted to be driven by a power tool.

14. The quick-release bit adapter as claimed in claim 1, with the first end of the body being a tubular portion, with the second end of the body being a hexagonal rod having an end inserted into the tubular portion, engaging the hexagonal rod with the tubular portion by tight coupling.

15. The quick-release bit adapter as claimed in claim 1, with the first end of the body being a tubular portion, with the second end of the body being a hexagonal rod including an end having a plurality of ridges extending along the longitudinal axis, with the end of the hexagonal rod inserted into the tubular portion, with the plurality of ridges engaged with an inner periphery of the tubular portion to engage the hexagonal rod with the tubular portion.

16. The quick-release bit adapter as claimed in claim 1, with the second end of the body being a handle, with the handle adapted to be gripped by the user to rotate the body for driving the bit.

* * * * *